UNITED STATES PATENT OFFICE.

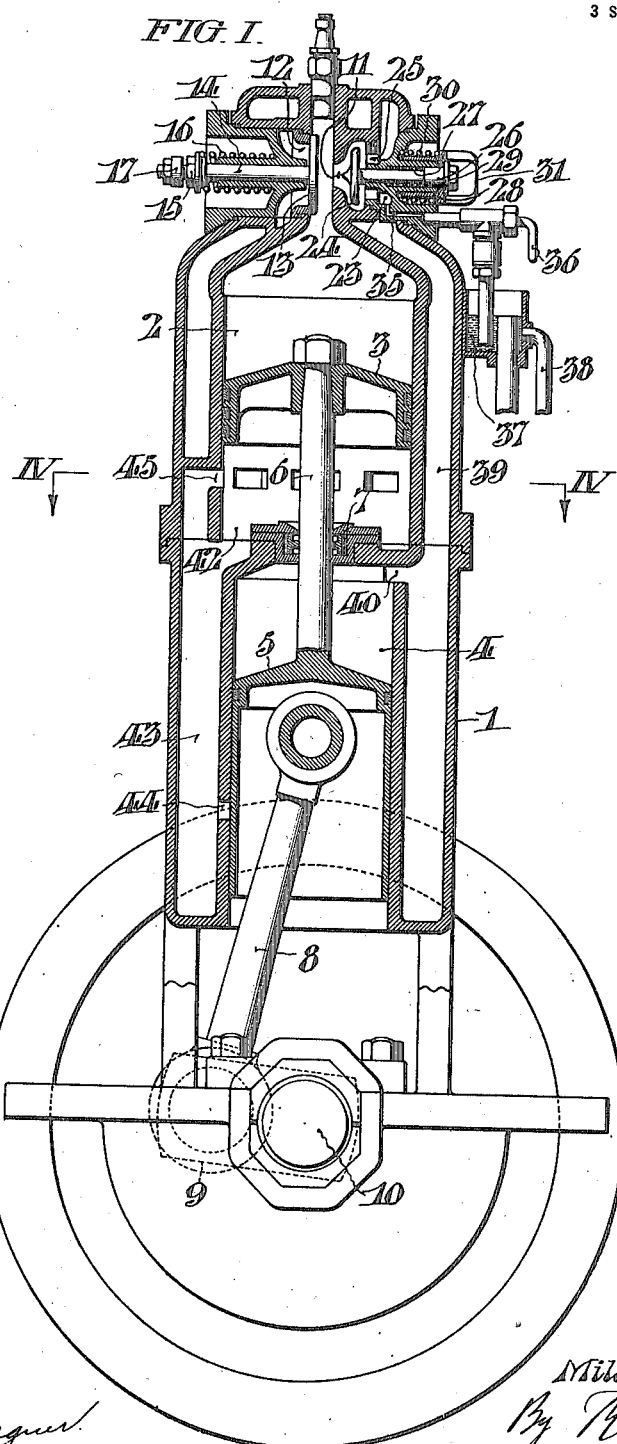

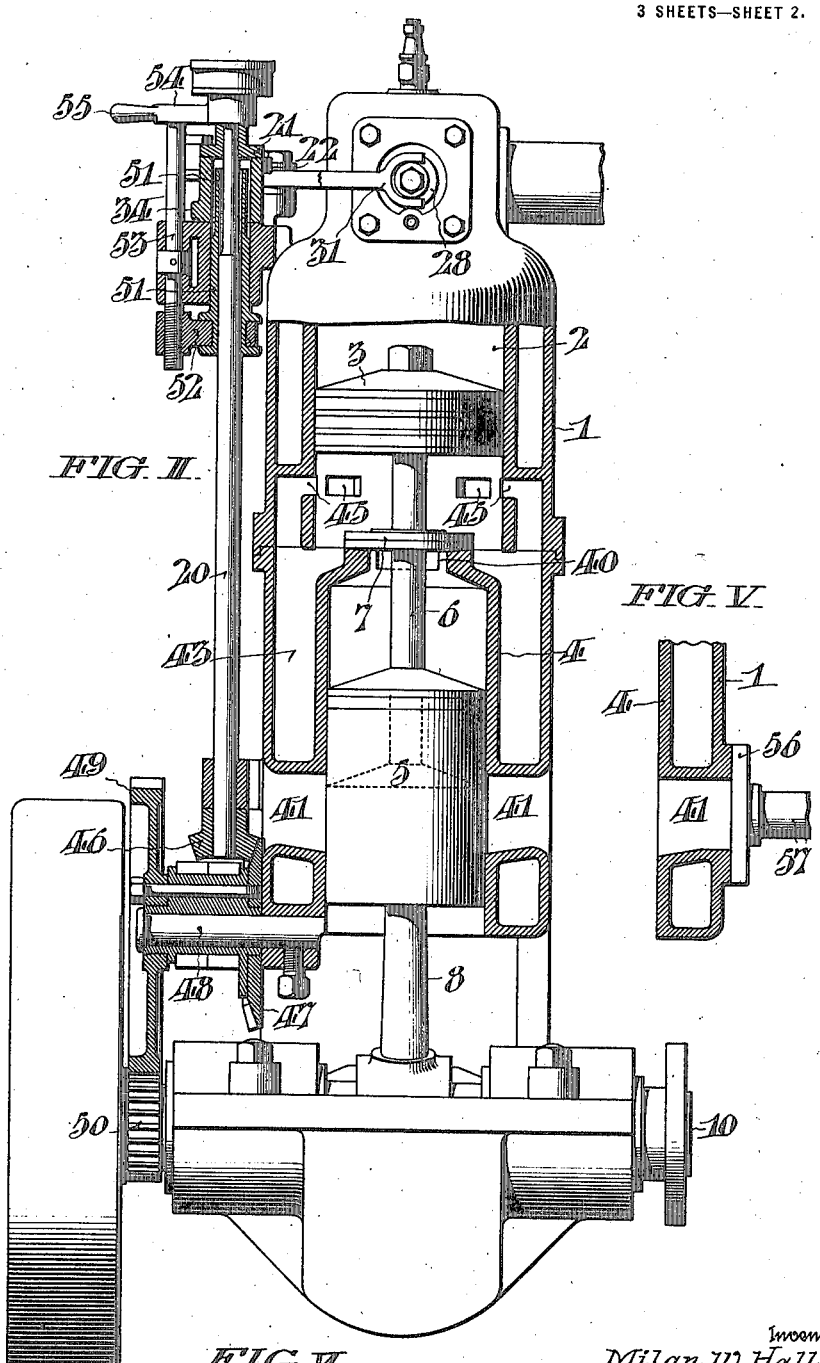

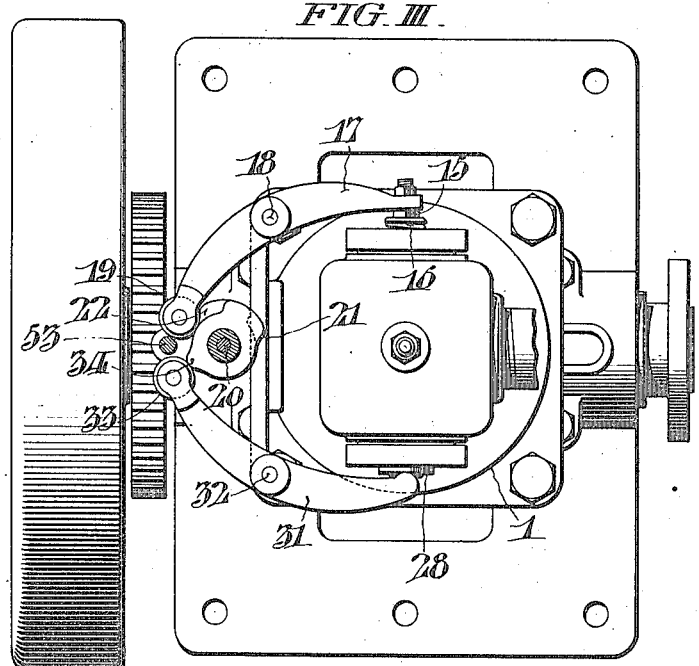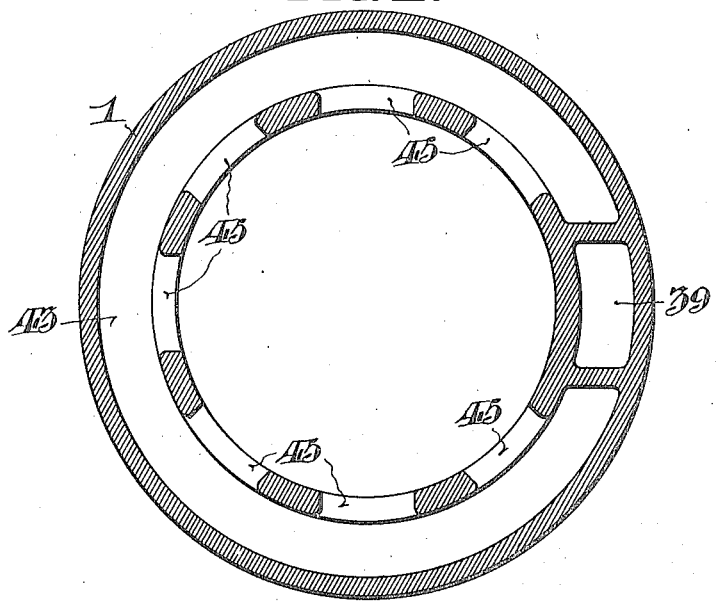

MILAN W. HALL, OF BALTIMORE, MARYLAND, ASSIGNOR TO HALL-SEELEY MOTOR CORPORATION, OF BALTIMORE, MARYLAND, A CORPORATION OF DELAWARE.

TWO-CYCLE GAS-ENGINE.

1,158,381.          Specification of Letters Patent.      Patented Oct. 26, 1915.

Application filed July 9, 1913, Serial No. 778,042. Renewed January 25, 1915. Serial No. 4,407.

*To all whom it may concern:*

Be it known that I, MILAN W. HALL, of Baltimore, in the State of Maryland, have invented certain new and useful Improvements in Two-Cycle Gas-Engines, whereof the following is a specification, reference being had to the accompanying drawings.

The invention relates more particularly to a two-cycle gas engine wherein fuel is atomized and delivered to the cylinder of the engine by compressed air.

An object of the invention is to provide a gas engine of the above character wherein there is a relatively high normal compression of the fuel gases in the cylinder, which compression may be readily regulated for varying speeds or power requirements.

A further object of the invention is to provide a device of the above character wherein the exhaust gases are quickly expelled from the cylinder by compressed air, admitted to the cylinder at the lower end of the stroke of the piston and prior to the opening of the intake controlling valve.

A further object of the invention is to provide means for simultaneously retarding the opening of the intake valve, the closing of the exhaust valve, and the timing of the spark.

A further object of the invention is to provide a two-cycle gas engine wherein the cylinder has a relatively small clearance above the piston, whereby a relatively high expansion may be secured, which cylinder is provided with an exhaust port and a valve controlling mechanism for closing said exhaust port, which mechanism is so timed as to prevent pre-ignition at maximum pressure.

A still further object of the invention is to provide a gas engine wherein the hot exhaust valve is located at a point adjacent the intake valve, and assists in vaporizing the gases delivered to the cylinder through the intake valve by compressed air operating to atomize and convey the fuel to the cylinder.

These and other objects will in part be obvious, and will in part be hereinafter more fully disclosed.

In the drawings, Figure I, is a vertical sectional view through a gas engine having my improvements applied thereto, the section being taken transverse of the driving shaft. Fig. II, is a similar view, the section being taken longitudinally of the shaft. Fig. III, is a top plan view. Fig. IV, is a section on the line IV, IV, of Fig. I. Fig. V, is a detail in section showing a modified form of the invention, wherein a carbureter is used for supplying a charge to the auxiliary cylinder. Fig. VI is a detail, showing in plan the handle for varying the timing of the spark and its connection to the valve shifting mechanism.

The invention consists generally in a gas engine comprising a cylinder in which reciprocates a piston, which cylinder has an exhaust port at its outer end controlled by a valve opening inwardly. This valve is spring-closed and is positively pressed open by a suitable cam-controlled mechanism. Adjacent the exhaust valve is an intake port which is also controlled by a valve, which is spring-closed and the tension of the spring is released by a cam actuated mechanism, so that the valve may be opened automatically. Adjacent the intake valve is a spark plug in which the time of sparking is controlled by a suitable timing device. Means is provided for simultaneously retarding the closing of the exhaust valve, the opening of the intake valve and the time of the sparking for varying speeds and power requirements. The fuel is delivered to the cylinder by compressed air which passes through the intake valve and serves to atomize the fuel as it is delivered to the cylinder. The cylinder is supplied with fresh air, and the exhaust gases expelled by compressed air, which is admitted to the cylinder just as the piston reaches the extreme lower end of its stroke.

An auxiliary cylinder and piston is provided for compressing the air used in atomizing the fuel.

Referring more in detail to the drawings, my improved gas engine consists of a casing 1, forming a cylinder 2, in which reciprocates a piston 3. The casing is also provided with a second auxiliary cylinder 4, in which reciprocates a piston 5. The piston 3, is connected to the piston 5, by a rod 6, which slides through a bearing 7, formed in the casing and dividing the cylinders 2, and 4, from each other. A pitman 8, is joined to the piston 5, and is connected to a crank 9, carried by a crank shaft 10, mounted in suitable bearings. The cylinder 2, at its upper end connects with a passage in one wall of which is an exhaust port 12, and in the other wall of which is an intake port 11. The exhaust port 12, is closed by a valve 13.

This valve is carried by a valve stem 14, threaded at its outer end and carrying a nut 15, against which a spring 16, bears. This spring rests against the casing at the other end, and normally serves to close the exhaust valve. The exhaust valve is forced open positively by a lever 17, see Fig. III. This lever is pivoted at 18, to the casing and carries a roller 19, which engages cams carried by a shaft 20. The cam 21, is fixed to the shaft and serves to move the lever so as to open the valve. The valve is held open until the releasing cam 22, operates to release the lever 17, and allow the spring to close the valve. The cam 22, for releasing the exhaust valve to permit the same to close is shiftable relative to the shaft 20, so as to vary the time of closing the valve. The means for shifting this cam will be more fully described hereinafter.

The intake port 11, leads to a fuel chamber 23, and an intake valve 24, controls the ports 25. The valve 24, is provided with a stem 26, which is formed with a shoulder against which a coiled spring 27, bears. This spring normally holds the valve closed. The spring is of very light tension, and will yield to any pressure against the valve tending to move the same away from the ports. A sleeve 28, engages a flange 29, on the valve stem, and a spring 30, bearing at one end against the sleeve and at the other end against the casing, forces the sleeve outward to close the valve. This spring is of heavy tension and will always hold the valve closed against the pressure of the compressed air, which carries the fuel through the intake ports to the cylinder. The valve is released from the tension of the spring 30, by a lever 31 (Fig. III). This lever is fulcrumed at 32, to the casing, and is formed with a forked end which bears against the sleeve 28. The other end of the lever 31, carries a roller 33, which coöperates with a cam 34, mounted on the shaft 20. This cam 34, is formed integral with the cam 22, which releases the lever for closing the exhaust valve, and said cam 34, is shifted with the cam 22. When the lever is moved outward at its outer end by the cam 34, the spring 30, will be compressed and this will relieve the valve from the pressure of the spring 30, and allow the valve to be opened by the force of the compressed air against the same.

Fuel is supplied to the fuel chamber through a fuel intake port 35, which is controlled by a suitable valve 36. The fuel supply is drawn from the fuel chamber 37, which is fed from a pipe 38. A channel 39 is connected by the port 40, with the cylinder 4, and said channel 39, at its upper end leads to the fuel chamber 23, so that air compressed in the cylinder 4, may be forced through the channel 39, and through the fuel chamber and intake ports into the cylinder. Air is supplied to the cylinder 4, when the piston moves downwardly by air intake ports 41, shown in full lines in Fig. II. The extreme downward movement of the piston 5, is indicated in dotted lines in this view.

Air is admitted to the rear of the piston 3, by a channel 42, which connects the cylinder 2, to the compression chamber 43. Air is admitted to the compression chamber through a port 44, which is controlled by the cylindrical body portion of the piston 5. The air in the compression chamber 43, is admitted in front of the piston 3, for expelling the exhaust gases through air intakes ports 45. These air intake ports are distributed about the cylinder, as shown in Fig. IV, and permit the air to quickly expel the exhaust gases.

The shaft 20, carrying the cams for controlling the valves is mounted in suitable bearings at the side of the cylinder and is operated by a bevel gear 46, which meshes with a second gear 47, on an auxiliary shaft 48, having a gear 49, which, in turn, meshes with a gear 50, on the engine shaft. The cam 21, which opens the exhaust valve is fixed to the shaft 20. The cam 22, and 34, are attached to a sleeve 51, by a spiral thread and groove, which sleeve, when moved endwise, is caused, through an oppositely arranged spiral groove connection with the shaft, to rotate slightly and thus rotate the cam to vary the position thereof. This sleeve is moved endwise by a forked arm 52, which has a threaded connection with a shaft 53, mounted in suitable bearings in the bracket supporting the shaft and the valve operating the cam. This shaft 53, at its upper end is formed with a gear which engages an internal segment gear 54, formed in the handle 55, of the device for shifting or varying the timing of the spark. It will thus be seen that when the handle 55, is shifted to retard the spark, the same movement of the handle simultaneously shifts the cams 22, and 34, so as to retard the closing of the exhaust valve and also retard the opening of the intake valve. When the handle 55, is shifted in the opposite direction so as to advance the sparking, then the time of closing the exhaust valve is advanced and the time of closing the intake valve is also advanced.

The operation of my device is as follows: When the piston 3, moves upwardly, a partial vacuum is created beneath it, and also in the compression chamber 43. At the termination of its upward stroke, the air intake port 44, is uncovered, as the lower edge of the piston 5, moves above said intake port. A charge of air is admitted through the intake port 44, into the compression chamber and beneath the piston 3. During the down It is obvious that minor changes in the details of construction and the arrangement of parts may be made without departing from the spirit of the invention, as set forth in the appended claims.

Having thus described my invention, I claim:

1. A two-cycle gas engine including in combination a cylinder, a piston, said cylinder having a valve-controlled exhaust port in the outer end thereof, and an air intake port adjacent the inner end of the stroke of the piston, means whereby air may be compressed by the piston, and delivered to said air intake port, a valve controlled fuel intake port adjacent the outer end of the cylinder, adjustable means for positively opening the valve for the intake port, and separate means for compressing air and delivering the same to said fuel intake port, whereby the fuel as it enters the cylinder is atomized.

2. A two-cycle gas engine including in combination a cylinder, a piston, said cylinder having a valve-controlled exhaust port in the outer end thereof, and an air intake port adjacent the inner end of the stroke of the piston, means whereby air may be compressed by the piston, and delivered to said air intake port, a valve controlled fuel intake port adjacent the outer end of the cylinder, adjustable means for positively opening the valve for the intake port, and separate means for compressing air and delivering the same to said fuel intake port, whereby the fuel as it enters the cylinder is atomized, said fuel intake port being so disposed relative to said exhaust valve that the fuel as it enters the cylinder is directed against said hot exhaust valve.

3. A two-cycle gas engine including in combination a cylinder, a piston, said cylinder having a valve-controlled exhaust port in the outer end thereof, and an air intake port adjacent the inner end of the stroke of the piston, means whereby air may be compressed by the piston, and delivered to said air intake port, a valve controlled fuel intake port, means for compressing air and delivering the same to said fuel intake port, whereby the fuel as it enters the cylinder is atomized, and devices for simultaneously retarding or advancing the closing of the exhaust valve and the opening of the intake valve.

4. A two-cycle gas engine including in combination a cylinder, a piston, said cylinder having a valve-controlled exhaust port in the outer end thereof, and an air intake port adjacent the inner end of the stroke of the piston, means whereby air may be compressed by the piston, and delivered to said air intake port, a valve controlled fuel intake port, means for compressing air and delivering the same to said fuel intake port, whereby the fuel as it enters the cylinder is atomized, and devices whereby the valve for the exhaust port and the valve for the intake port may be simultaneously retarded or advanced with the retarding or advancing of the spark respectively.

5. A two-cycle gas engine including in combination a cylinder having a combustion chamber, a piston, said cylinder having a valve-controlled exhaust port in the outer end thereof, and an air intake port adjacent the inner end of the stroke of the piston, a compression chamber having communication with the cylinder beneath the piston, whereby air is compressed in said compression chamber and delivered through said air intake ports to the cylinder, a second cylinder, a piston therefor connected to said first named piston, and moving in unison therewith, a valve controlled intake port adjacent the outer end of the cylinder for supplying fuel to the combustion chamber, adjustable means for positively opening said valve for the intake port, a channel connecting said second cylinder with the valve controlled intake port for the combustion chamber, whereby air may be compressed and utilized in atomizing the oil and delivering the same to the combustion chamber.

6. A two-cycle gas engine including in combination a cylinder having a combustion chamber, a piston, said cylinder having a valve-controlled exhaust port in the outer end thereof, and an air intake port adjacent the inner end of the stroke of the piston, a compression chamber having communication with the cylinder beneath the piston, whereby air is compressed in said compression chamber and delivered through said air intake ports to the cylinder, a second cylinder, a piston therefor connected to said first named piston, and moving in unison therewith, a valve controlled intake port adjacent the outer end of the cylinder for supplying fuel to the combustion chamber, a channel connecting said second cylinder with the valve controlled intake port for the combustion chamber, whereby air may be compressed and utilized in atomizing the oil and delivering the same to the combustion chamber, and means for simultaneously retarding the closing of the exhaust port valve and the valve for the fuel intake port.

7. A two-cycle gas engine including in combination a cylinder having a combustion chamber, a piston, said cylinder having a valve-controlled exhaust port in the outer end thereof, and an air intake port adjacent the inner end of the stroke of the piston, a compression chamber having communication with the cylinder beneath the piston, whereby air is compressed in said compression chamber and delivered through said air intake ports to the cylinder, a second cylinder, a piston therefor connected to said first stroke of the piston 3, this air is compressed. When the crank has reached a point substantially 45° from the bottom of its stroke, the exhaust valve 13, is opened by action of the cam 21. Shortly after the exhaust valve is opened the air intake ports 45, are uncovered by a further downward movement of the piston 3. The air compressed beneath the piston 3, and in the compression chamber 43, flows into the cylinder 2, and charges it with air, at the same time expelling the burned gases through the exhaust port. During this down stroke of the piston 3, a partial vacuum is created in the cylinder 4, channel 39, and fuel chamber 23, for the reason that the piston 5, moves downward with the piston 3. The vacuum thus created serves to induce the flow of the fuel from the reservoir 37, through the regulating valve 36, into the recess or fuel chamber 23, which constitutes the fuel charge. During the next upward stroke of the piston 3, the exhaust valve 13, is held open until said piston has reached a point substantially equal to one-half of its up stroke, after which the exhaust valve is closed by the releasing cam 22. During this half of the up stroke of the pistons 3, and 5, the air in the cylinder 4, channel 39, and fuel chamber 23, has been sufficiently compressed so that when the intake valve 24, is released by the action of the cam 34, the compressed air will force the valve 24, open, compressing the light spring 27, and permit the rush of air and fuel into the cylinder 2. During a further up stroke of the piston 3, the mixture of air and fuel in the cylinder 2, will be compressed. When the compression in the cylinder 2, equals that in the fuel chamber 23, the channel 39, and cylinder 4, then the valve 24, closes automatically. The piston 3, then completes its compression stroke and the charge is exploded by a spark from the spark plug at the end of the cylinder. The piston 3, is driven downward through its working stroke until the exhaust valve 13, is again opened releasing the burned gases of any pressure they may have at this point, and the further downward movement of the piston 3, uncovers the air intake ports 45, and the cycle is repeated.

The above description of the operation applies to the action of the engine when working at full power. When less power or less speed is required, the volume of the charge is reduced by retarding the closing of the exhaust valve 13. As above noted, when the time of closing of the exhaust valve is varied simultaneously the time of releasing the intake valve is also varied, and the time of sparking is changed. In other words, the retarding of the closing of the exhaust valve also retards the opening of the intake valve and retards the time of sparking, while the advancing of the closing of the exhaust valve also advances the opening of the intake valve and the time of sparking.

It will be seen from the foregoing that varying quantities of air will be released at the intake valve 24, to cause a varying vacuum in the fuel chamber 23, channel 39, and cylinder 4, on the down stroke of the piston 5. In this manner the amount of fuel may be varied in proportion to the work required.

The volume of clearance above the piston 5, is such that when the piston has reached its upward mid-stroke, the pressure above it will be sufficient to thoroughly atomize the fuel as it carries it through the intake ports 25, against the hot exhaust valve 17. The hot exhaust valve will also assist in vaporizing fuel as the atomized fuel entering the cylinder will be directed against said hot exhaust valve.

From the above it will be apparent that I have provided a construction wherein the clearance above the piston in the main cylinder may be made relatively small and thereby the expansion will be relatively large. It is well understood that in engines of this type the efficiency of the engine is increased by a relatively large expansion. Where, however, the clearance is small, care must be taken that the compression of the gases is not so excessive as to cause a pre-ignition. By my construction, wherein the exhaust valve is held open during a part of the upward stroke of the piston, said valve operating mechanism may be so regulated that the maximum compression will be well within the limits of pre-ignition, and by connecting this exhaust valve controlling mechanism with the intake valve controlling mechanism, I am able to maintain a proper regulation of the compression to the volume of the gases admitted to the cylinder. Furthermore, by connecting the valve operating mechanisms to the timer, I am able to so regulate the time of spark so that there can be no possible chance of a spark prior to the time of closing of the intake valve.

In Fig. V, of the drawings I have shown a slightly modified form of the invention, wherein the air intake port 41, is closed by a plate 56, which is provided with a threaded opening to which a pipe 57, connected with a carbureter may be attached. When desired, the main oil valve 36, may be closed and the gases pre-mixed by the carbureter compressed in the auxiliary cylinder, and then delivered to the main cylinder. This is especially useful when it is desired to run the engine slowly. The fuel supply to the carbureter may be cut off and simply air drawn through the carbureter to the auxiliary cylinder when the fuel is again admitted through the valve 36.

named piston, and moving in unison therewith, a valve controlled intake port adjacent the outer end of the cylinder for supplying fuel to the combustion chamber, a channel connecting said second cylinder with the valve controlled intake port for the combustion chamber, whereby air may be compressed and utilized in atomizing the oil and delivering the same to the combustion chamber, and devices for simultaneously retarding or advancing the closing of the exhaust port valve, and the intake port valve as the spark is retarded or advanced respectively.

In testimony whereof, I have hereunto signed my name at Philadelphia, Pennsylvania, this twenty-fifth day of June, 1913.

MILAN W. HALL.

Witnesses:
 JAMES H. BELL,
 E. L. FULLERTON.